(12) United States Patent
Qvarth

(10) Patent No.: US 6,334,740 B1
(45) Date of Patent: Jan. 1, 2002

(54) TOOL FOR CHIP-BREAKING MACHINING

(75) Inventor: Ingemar Qvarth, Valbo (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 09/427,757

(22) Filed: Oct. 27, 1999

(30) Foreign Application Priority Data

Oct. 27, 1998 (SE) .............................................. 9803672

(51) Int. Cl.⁷ ................................................. B23C 5/24
(52) U.S. Cl. ............................ 407/36; 407/46; 407/49; 407/52
(58) Field of Search ............................. 407/38, 36, 44, 407/46, 52, 47, 49, 37

(56) References Cited

U.S. PATENT DOCUMENTS

| 2,863,210 A | * | 12/1958 | Tucker | 407/49 |
|---|---|---|---|---|
| 3,551,979 A | * | 1/1971 | Berry, Jr. | 407/44 |
| 3,675,290 A | * | 7/1972 | Mayer | 407/46 |
| 3,887,974 A | * | 6/1975 | Sorice | 704/113 |
| 4,040,156 A | * | 8/1977 | Tack | 407/44 |
| 4,264,245 A | * | 4/1981 | Lindsay | 407/49 |
| 5,395,186 A | | 3/1995 | Qvarth | |
| 5,658,101 A | * | 8/1997 | Hammer | 407/44 |
| 5,800,079 A | * | 9/1998 | Qvarth | 407/46 |

* cited by examiner

Primary Examiner—William Briggs
Assistant Examiner—Erica E Cadugan
(74) Attorney, Agent, or Firm—Burns, Doane, Swecker & Mathis, L.L.P.

(57) ABSTRACT

A milling tool includes a number of peripheral recesses, each of which accommodates an insert-carrying cartridge, and a clamping wedge which is tightenable by of a clamping screw. The clamping wedge includes two separate contact surfaces. One of the contact surfaces presses the cartridge into its respective recess. The other contact surface presses the insert into its seat in the cartridge while simultaneously pressing the cartridge into the recess.

13 Claims, 4 Drawing Sheets

TOOL FOR CHIP-BREAKING MACHINING

RELATED INVENTION

Figure 1:
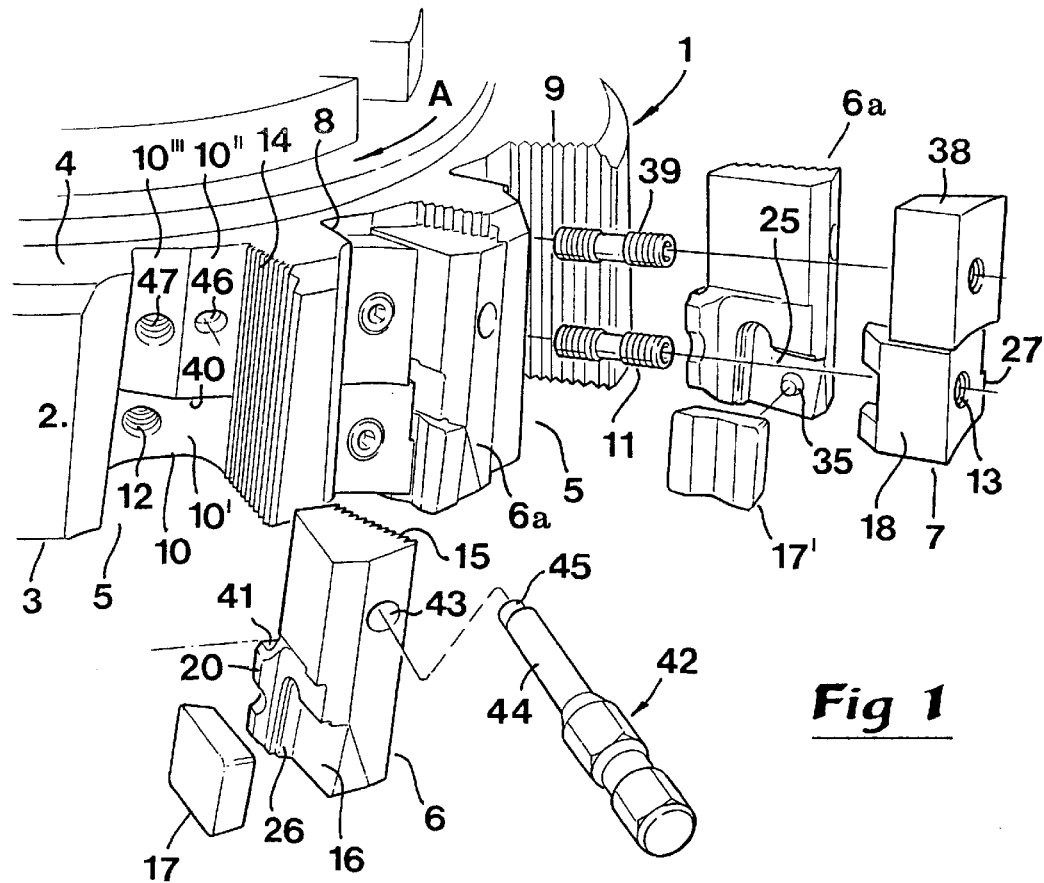

This invention is related to the invention disclosed in concurrently filed application Ser. No. 09/427,756, the disclosure of which is incorporated herein by reference.

BACKGROUND OF THE INVENTION

The present invention relates to a tool intended for metal chip-breaking machining.

Such tools are known which comprises a body that is rotatable around a central geometrical axis, said body having a peripheral envelope surface in which one or several recesses are delimited by a bottom wall, and leading and trailing walls which diverge outwardly from the bottom wall. Each one of said recesses has the purpose of accommodating on one hand a cartridge having a cutting insert provided in a seat in said cartridge, and on the other hand a clamping wedge intended for fixing the cartridge. The wedge is tightenable by means of a clamping screw in engagement with a threaded hole that extends into the bottom wall in the body. The trailing wall of the recess has first serrations provided to cooperate with analogous second serrations formed on a trailing side of the cartridge opposed to the cutting insert. The leading wall of the recess is smooth in order to cooperate with an equally smooth leading surface of the clamping wedge. A trailing contact surface of the clamping wedge and a leading contact surface of the cartridge are both smooth in order to, when in contact with each other, permit a substantially radial displacement of the clamping wedge relative to the cartridge in connection with the fastening of the latter.

In particular—although not exclusively—the invention relates to milling tools, e.g., square shoulder facemills, facemills, slitting cutters or the like.

PRIOR ART

A tool realized in the shape of a milling cutter of the type as generally described above, is previously known from SE 9103724-2 (corresponding to U.S. Pat. No. 5,395,186). In this case, the individual cartridge can be introduced into the appurtenant recess from either the front or the back of the tool body, the determination of the axial position of the cartridge relative to the recess being adjusted by means of a radially oriented pin provided on the lower side of the cartridge, which pin is arranged to engage into a depression formed in the bottom wall of the recess, said depression having a larger diameter than the pin. Furthermore, each individual cutting insert is fastened on the appurtenant cartridge by means of a headed screw that extends through a through-hole in the cutting insert and is tightened into a threaded hole in the cartridge. The fact that the construction includes both a clamping wedge for fixing the cartridge per se, and a particular clamping screw for fixing the cutting insert on the cartridge, in practice means that the tolerance chain between on the one hand the tool body and its axis of rotation, and on the other hand each one of the numerous cutting inserts, becomes long. Inter alia, this leads to a situation where the precision of the positioning of the cutting inserts relative to the tool body (which in practice should be less than $1/100$ mm) may easily be lost or become unsatisfactory, e.g., when the cutting inserts are to be replaced or indexed, or when for any reason, the cartridge has to be dismounted and remounted. In addition thereto, the task of fine-adjusting the cutting inserts and the appurtenant cartridges relative to the tool body is tedious and time-consuming, something that is particularly disturbing when the milling tool is to operate at high speeds of rotation and/or to cut tough materials, which gives limited life of the cutting edges of the inserts and, thereby, necessitates frequent replacement or indexing of the cutting inserts.

OBJECTS AND CHARACTERISTICS OF THE INVENTION

The present invention aims at eliminating the above mentioned inconveniences of previously known tools of the type in question and creating an improved tool, in particular a milling tool. Thus, a primary object of the invention is to provide a tool with detachable cutting inserts which may be fixed in seats in appurtenant cartridges without the use of means other than the clamping wedges that are used for the fixing of the cartridges in the peripheral recesses of the tool body.

A further object is to provide a tool in which the individual cartridge as well as the appurtenant cutting insert are capable of, with ease, assuming exactly defined operative positions relative to the tool body in connection with the mounting of, on one hand, the cartridge in the recess and, on the other hand, the cutting insert in the cartridge seat. Another object is to create a tool with a good ability to withstand at least minor break-downs in connection with, e.g., instantaneous and abrupt impact and shock loads.

In particular, the cartridge should be capable of resisting such loads without being seriously damaged or dislocated from its basic position. still another object of the present invention is to provide a tool particularly intended for milling purposes, which may work at very high speeds of rotation, e.g., up to the range of 20,000 to 30,000 rpm. One particular aspect of the invention aims at providing a tool whose cutting inserts are secured centrifugally in a reliable way, even when the tool is caused to rotate at very high speeds of rotation.

According to the invention, at least the primary object is achieved by providing a clamping wedge with two separate contact surfaces. One of the clamping surfaces functions to press an insert-carrying cartridge into a respective recess of a tool body, and the other contact surface functions to press the insert into its insert sea of the cartridge while also pressing the cartridge into its recess.

BRIEF DESCRIPTION OF THE APPENDED DRAWINGS

Figure 2:
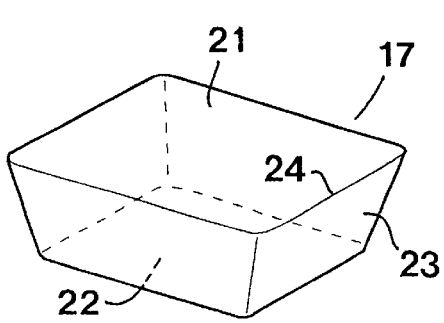
Figure 3:
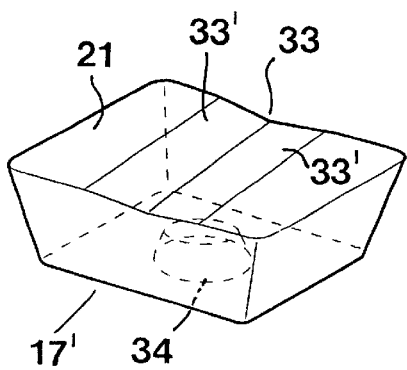
Figure 4:
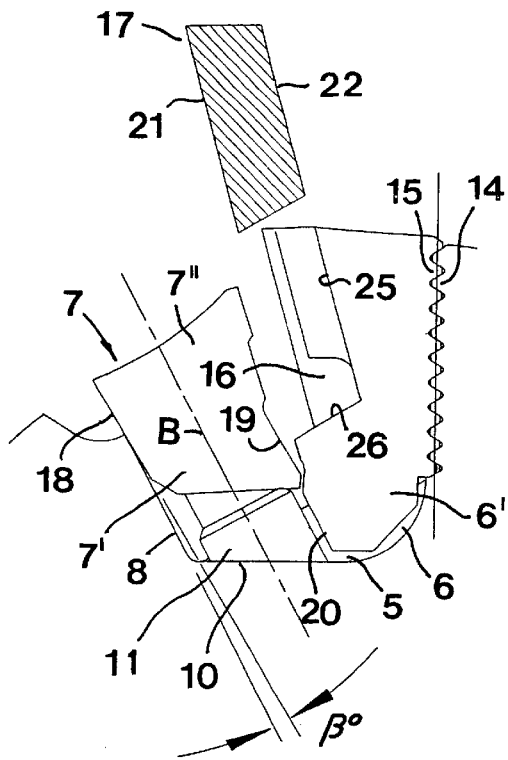
Figure 5:
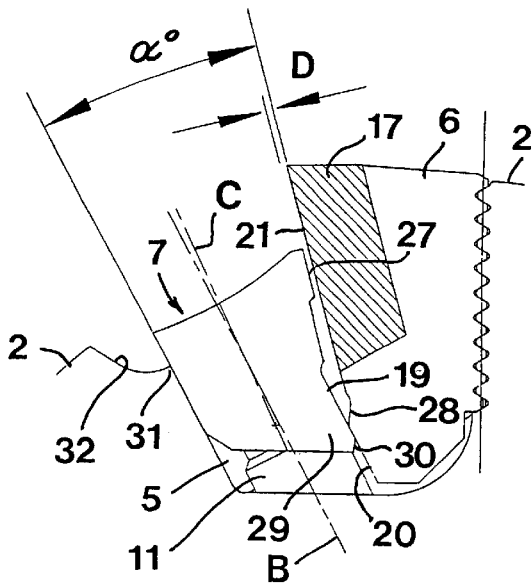
Figure 6:
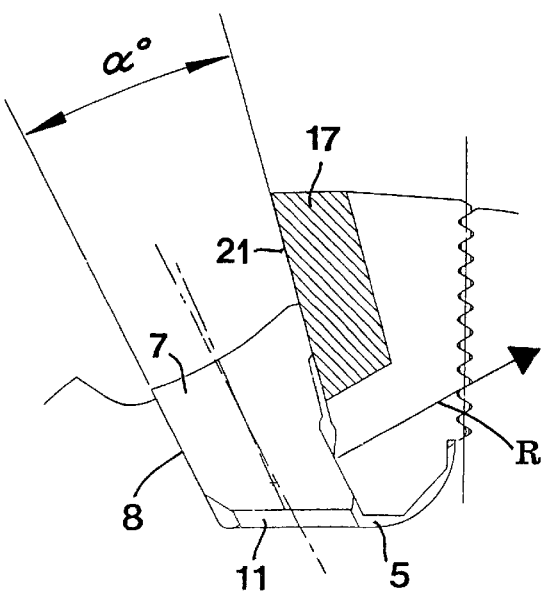
Figure 7:
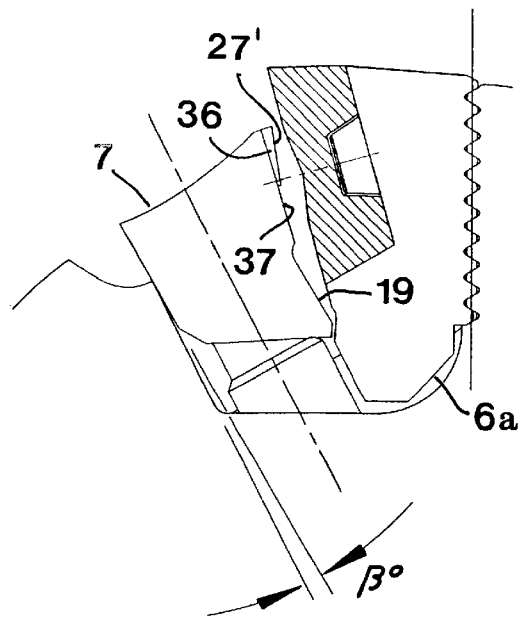
Figure 8:
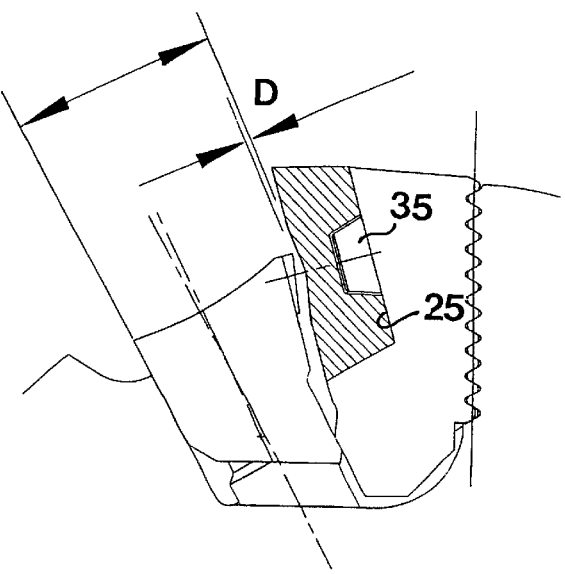
Figure 9:
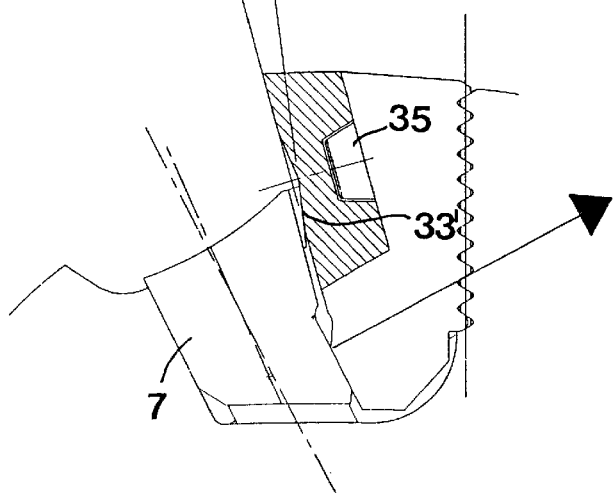
Figure 10:
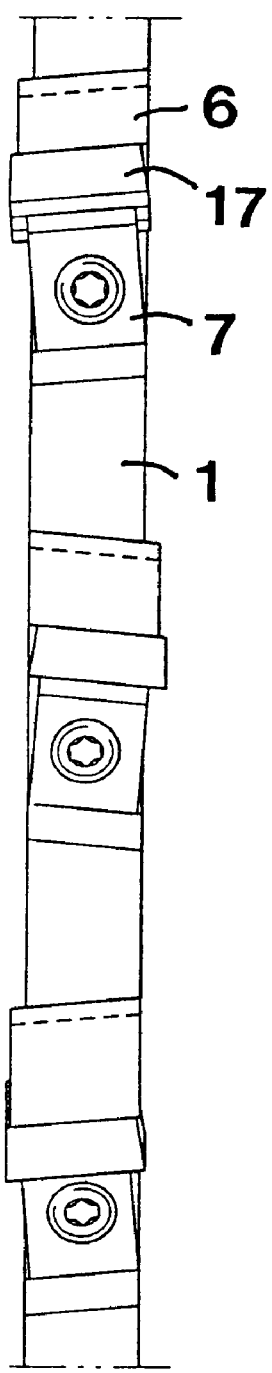

In the drawings:

FIG. 1 is a perspective exploded view showing a part of a tool according to the invention, more specifically in the form of a milling tool, and a number of cartridges and cutting inserts belonging to the tool, FIG. 2 is a perspective view of an individual cutting insert which forms part of the tool, FIG. 3 is a further perspective view showing an alternative embodiment of the cutting insert, FIG. 4 is a partial, schematic side view showing a cartridge, a cutting insert and a clamping wedge in a first functional state, FIG. 5 is a side view corresponding to FIG. 4 showing said components in a second functional state, FIG. 6 is a third side view showing a third functional state, FIG. 7 to 9 are side views of the same type as in FIG. 4 to 6, but showing an alternative embodiment of the cutting insert, viz. the embodiment that is illustrated in FIG. 3, and FIG. 10 is a simplified planar view of a portion of an alternative embodiment of the tool according to the invention, viz. in the form of a slitting cutter.

DETAILED DESCRIPTION OF THE EMBODIMENTS OF THE INVENTION

In FIG. 1, reference numeral 1 designates in general a body in the shape of a milling cutter head which is rotatable around a central geometrical longitudinal axis. In the example, the body 1 is delimited by a peripheral, envelope-like surface 2 that extends between opposed axially spaced gable surfaces 3, 4, of which the former 3 is constituted by a front side, in whose proximity the cutting inserts of the tool are located, while the latter 4 is constituted by a rear side, to which a rotatable spindle or the like (not shown) is connected in a suitable manner.

Outwardly diverging recesses 5, which open radially outwards and have the purpose of accommodating on the one hand a cartridge 6 or 6a, and on the other hand at least one clamping wedge 7, are formed in the envelope surface 2. Each individual recess 5 (see also FIG. 4 to 6) is delimited by a radially extending leading wall 8, a radially extending trailing wall 9 and a bottom wall 10 interconnecting radially inner ends of walls 8, 9. The clamping wedge 7 cooperates with, and is tightenable by, a screw 11 which is in engagement with a threaded hole 12 that extends into the bottom wall 10 of the recess 5. More specifically, the screw 11 is of the type that comprises both a right-hand thread and a left-hand thread, these threads being separated front each other via a narrow waist portion. One of these threads engages with the hole 12 in the tool body, while the other thread engages with a threaded through-hole 13 in the clamping wedge 7. The two male threads on the screw 11 have a certain play relative to the female threads of the holes 12, 13. Thanks to the existence of double threads on the screws 11, it becomes possible to move the clamping wedge 7 in a way known per se that gives increased velocity relative to the body, e.g., with double velocity in comparison with one single thread in connection with a rotation of the screw in either direction of rotation.

The trailing wall 9 of recess 5 has first serrations generally designated 14 arranged to cooperate with analogous, second serrations 15 formed on a trailing side of the cartridge 6. In this context it should be pointed out that the terms "leading" and "trailing" walls, respectively, relate to the direction of rotation of the tool, which is indicated by the arrow A. Thus, when seen in the direction of rotation of the tool, the serrations 15 are formed on that trailing side of the cartridge that is facing away from a leading side in which a seat 16 is provided for a cutting insert 17.

The leading wall 8 of an individual recess 5 (see also FIG. 4 to 6) is at least partly smooth and suitably planar in order to cooperate with an equally smooth and planar leading surface 18 on the clamping wedge 7. A trailing contact surface 19 on the clamping wedge 7 is equally smooth and planar in order to cooperate with a leading, planar and smooth contact surface 20 on the cartridge 6. As a result of the fact that said surfaces 8, 18, 19 and 20 are smooth, the clamping wedge may be moved, without obstruction substantially radially relative to the tool body and the cartridge in connection with the clamping of the latter.

Although the serrations 14, 15 are of a known type, which is an advantage, it deserves mentioning that the same are generally comprised of ridges separated by intermediate grooves. As may be seen in FIG. 1 in combination with, e.g., FIG. 4, each of the first and second serrations comprises a set of elongated, straight and parallel ridges which may engage in the grooves of the other serrations. Advantageously, both the ridges and the grooves have a triangular cross-sectional shape, the free crests of the ridges being topped so that the ridges do not touch the bottoms of the cooperating grooves when the serrations are brought into meshing engagement with each other. This implies that each individual ridge in one of the serrations is wedged very firmly between a pair of adjacent ridges in the other serrations. In other words, a plurality of wedge joints is obtained at the boundary between the cartridge and the tool body. In practice, the top angle between the flank surfaces of the individual ridge (and the corresponding angle between the side surfaces of the individual groove) may amount to about 65°. Advantageously—however not necessarily—the serrations 14 may extend the whole way along the axial length of the recess 5, i.e., between the gable surfaces 3, 4, and the serrations 15 extend along the whole length of the cartridge 6.

As far as the milling tool shown in the drawings has been described hereto, it is substantially known from U.S. Pat. No. 5,395,186.

Before the distinguishing features of the tool according to the invention are described more thoroughly, it should be pointed out that the two different embodiments of cutting inserts that are shown in FIG. 2 and 3 respectively, are illustrated in FIG. 1. More specifically, the cutting insert 17 (according to FIG. 2) is shown coupled with a cartridge 6 which in a certain respect differs from the two cartridges 6a that accommodate a cutting insert 17' (of the type shown in FIG. 3). In practice, only cartridges with cutting inserts of one and the same uniform type are used on the milling tool, but due to space reasons it has been chosen to illustrate both types of cutting inserts and cartridges in one and the same figure.

Reference is now made to FIG. 2, 4, 5 and 6, which illustrate the invention as applied to the cartridge 6 shown to the left in FIG. 1. In this case, the cutting insert 17 is of a simple type, as far as it is delimited by substantially planar top and bottom sides 21, 22, and a number of oblique relief surfaces 23. Between the top side 21 and the individual relief surface 23 a cutting edge 24 is formed. The seat 16 in the cartridge 6 has, of course a shape that is suited to the shape of the cutting insert. Thus, the seat is delimited by a planar bottom surface 25 and two side surfaces 26 extending perpendicularly to each other, which are inclined relative to the bottom wall 25 at the same angle as the angle between the relief surfaces 23 of the cutting insert and the bottom side 22.

It is characteristic for the present invention that the clamping wedge 7 includes an inner portion 7' on which the before-mentioned, trailing contact surface 19 is formed, and an outer part 7" having a secondary contact surface 27 which is offset backwards (i.e. away from the direction of rotation) relative to the first-mentioned contact surface 19. In other words, the secondary contact surface 27 is situated behind an imaginary plane containing the surface 19. Moreover, the leading contact surface 20 on the cartridge 6 is formed on an inner part 6' of the cartridge which part 6' is located radially inside the seat 16. The contact surface 20 is inclined at a certain angle relative to the top surface 21 of the cutting insert and the bottom surface 25 of the seat, respectively. In FIG. 6, in which the cartridge 6 as well as the cutting insert 17 are shown in a fixed state, α designates an angle between, on the one hand the leading wall 8 of the recess 5 and on the other hand the top surface 21 of the cutting insert. In this state, the contact surface 20 is parallel to the wall 8, from which it follows that the angle between the contact surface 20 and the floor 25 of the seat is equal to the angle α. According to the depicted embodiment, this angle α amounts to 12°. In practice, the angle α may vary, but should lie within the range 8 to 25°, suitably 10–20° and most preferably 11–15°.

The secondary abutment surface 27 on the clamping wedge 7 also extends at a certain angle to the trailing contact surface 19, namely, at said angle α.

At its radial outer edge, the leading abutment surface 20 of the cartridge 6 transposes into an oblique chamfer surface 28, along which an inner end portion 29 of the clamping wedge may slide during its introduction into the space between the cartridge and the leading wall 8 of the recess. Advantageously, this inner end portion 29 is also formed with a chamfer surface 30 that is inclined at an acute angle relative to the rear contact surface 19 of the clamping wedge.

In FIG. 4, the clamping wedge 7 is shown in a non-tightened state. A geometrical central line of the wedge is designated B, which in the state according to FIG. 4 is common for the screw 11 and the two threaded holes 12, 13 in the tool body and the clamping wedge, respectively. In this state, the front surface 18 of the clamping wedge is somewhat inclined relative to the leading wall 8 of the recess, more specifically at an angle designated β. In practice, the angle β may amount to about 3°.

The function of the invention should be evident from a comparison between FIG. 4, 5 and 6. In the state as shown in FIG. 4, the cutting insert 7 is separated from the cartridge 6, and the cartridge is inserted into the recess 5 without being influenced by the clamping wedge 7. The wedge 7 is mounted on the screw 11 and kept fastened relative to the body by the fact that the thread of the screw is provisionally tightened in the hole 12. By tightening the screw 11 (which may be done from the outside of the clamping wedge by means of, e.g., a hexagon key), in a first step the clamping wedge may be moved to the position that is shown in FIG. 5. Here, the clamping wedge has been pulled in so far that the trailing contact surface 19 of the clamping wedge has abutted the leading contact surface 20 of the cartridge, after the two chamfer surfaces 28, 30 have slid along each other and passed each other. At the moment when the chamfer surface 30 passes the chamfer surface 28, a wedging effect is achieved that brings the serrations 15 of the cartridge into a meshing engagement with the serrations 14 of the tool body. At the same time, the clamping wedge is caused to turn clockwise around the fulcrum that is created by the linear edge 31 formed by the intersection of the wall 8 and a vaulted surface 32 located between the recess 5 and the envelope surface 2 of the tool body. More specifically, the clamping wedge is forced to turn in such a way that its leading surface 18 is pressed with complete surface contact against the leading wall 8 of the recess. It is true that this requires that the geometrical central axis C for the threaded hole 13 in the clamping wedge be turned by β relative to the central axis B for the threaded hole 12. In practice, this angular change may very well be accommodated by the previously mentioned play between the male threads of the screw 11 and the female threads of the holes 12, 13.

When the clamping wedge 7 has taken its position as shown in FIG. 5, the cartridge per se is fixed in a reliable way by the wedge joint between the serrations 14, 15. However, the cutting insert 17 is still freely movable into and out of the seat 16, in that the distance between the secondary contact surface 27 and the seat floor 25 is somewhat larger than the thickness of the cutting insert. In practice, this dimensional difference, which in FIG. 5 is designated D, amounts to 0.2 to 0.4 mm, depending on the overall geometry of the construction.

In a concluding, third step that is shown in FIG. 6, the screw 11 and the clamping wedge 7 are finally tightened. Thereby, the secondary contact surface 27 on the clamping wedge will be gradually moved radially inwards relative to the cutting insert, in order to be finally pressed and wedged against the top side 21 of the cutting insert. In this state, the clamping wedge thus fixes not only the cartridge 6 but also the cutting insert 17.

In order to replace or index the cutting insert 17, the insert may be quickly and easily detached from the cartridge by the simple measure of unscrewing the screw and the clamping wedge a bit, to the position which is shown in FIG. 5 and in which the secondary contact surface 27 is distanced from the top side of the cutting insert. In this state, the cartridge 6 is still reliably fixed in the appurtenant recess; more specifically by the fact that the clamping wedge still presses the cartridge by a force resultant R (see FIG. 6) that intersects the serrations 14 at a level radially outside its radially innermost ridge.

Being able to utilize one and the same means, namely the clamping wedge, for fixing both the cartridge and the cutting insert, without any necessity of detaching and remounting the cartridge when removing the cutting insert from the seat, is a considerable advantage in connection with the practical use of the tool, because the risk of tolerance errors is reduced, and the changing and indexing of the cutting insert are simplified. Another advantage of the invention is that the point of contact between the contact surfaces 19, 20 of the clamping wedge and the cartridge form an abutment that is radially deeply located in the appurtenant recess, which abutment effectively counteracts possible tendencies of the cartridge and the cutting insert to tip during situations when the cutting insert is exposed to large tangential forces. The deep location of the contact place between the contact surfaces 19, 20 also brings about the ability to shape the clamping wedge with a limited radial height. In other words, the radially outwardly facing surface of the clamping wedge may be placed relatively deeply within the recess in relation to the operative cutting edge of the cutting insert, while attaining a large space for chip removal adjacent to the top side of the cutting insert. In this context it should also be mentioned that the absence of clamping screws for retaining the cutting insert improves the conditions for using cutting inserts of hard and brittle materials, such as ceramics.

In practice, the tool construction illustrated in FIG. 1 permits the body 1, as such, to be made of aluminum or another light-weight material, while the cartridges and clamping wedges may be made of steel or similar material. By giving the tool body, which is voluminous in comparison to the cartridges and the clamping wedges, a low weight, the total weight of the tool can be radically reduced; something that on one hand makes possible shorter acceleration and retardation times in connection with frequently repeated starting and stopping operations, and on the other hand makes possible an operative running with extremely high speeds of rotation, e.g., in the range of 20,000 to 30,000 rpm.

In practice, the embodiment described in connection with FIG. 2, 4, 5 and 6 with a cutting insert having planar top and bottom sides, is suitable for running at medium high speeds of rotation, e.g., up to the range 10,000 to 20,000 rpm, but less so for extremely high speeds of rotation.

In FIG. 3 and 7 to 9, and in the right part of FIG. 1, an embodiment of the invention is shown that may be advantageously used when it is desired to work with extraordinarily high rotation speeds. As may be seen in FIG. 3, this embodiment comprises a cutting insert 17', in whose top side 21 is formed a first depression 33 which has the shape of a substantially V-shaped groove that extends between two opposed edges of the insert. More specifically, the V-groove 33 is delimited by two planar side surfaces 33'. In FIG. 3 it may also be seen how the V-groove 33 extends at a certain acute angle relative to two opposed cutting edges (for the simple reason that the milling tool is intended for square shoulder facemilling and has an overall geometry adapted for this purpose). Furthermore, a recess generally designated 34 is formed in the bottom surface 17'. In practice, this recess may be comparatively shallow and have a symmetrical shape, e.g., the basic shape of a frustum of a cone.

As may be seen in the right part of FIG. 1 as well as in FIG. 7 to 9, a projection 35 is provided on the floor 25 of the cutting insert seat, for engagement with the recess 34 in the cutting insert, In practice, the male means may be a projection having the some basic shape as the recess 34, but of smaller cross-section, so that the external side of the projection normally never comes in touch with the internal side of the recess.

In FIG. 7 to 9 it may be seen how the secondary contact surface 27' of the clamping wedge 7 is provided on a special heel 36 on the clamping wedge. More specifically, this heel 36 is disposed on a surface designated 37, which in turn extends at a certain, moderate angle to the trailing, primary contact surface 19 of the clamping wedge. The angle designated $\lambda$ in FIG. 9 between the individual side surface 33' in the V-groove 33 and the top surface 21, may amount to about 8°. The secondary contact surface 27' is inclined relative to surface 37 by the same angle $\lambda$, i.e., by 8°. Of course, the angle $\lambda$ may deviate from exactly 8°, but in practice it should lie within the range of 6 to 12'.

When the clamping wedge 7 is finally tightened in the position according to FIG. 9, then the protrusion 35 and the heel 36 cooperate to secure the cutting insert from the risk of being flung radially outwards from the seat by centrifugal force. In its fixed position according to FIG. 9, the cutting insert is held clamped by means of the clamping wedge 7 as previously described, although with the difference that the heel 36 mechanically engages into the depression 33 of the insert. However, in this state the protrusion 35 is normally inactive, in that the same lacks contact with the internal side of the recess 34. Only in an extreme case, would the protrusion 35 become active, viz. if the cutting insert during work at very high speeds of rotation would be submitted to shook impacts and/or an extra-ordinarily large centrifugal forces. In these cases, the protrusion guarantees that the cutting insert does not leave the seat even if the side surface in question in the V-groove would tend to slide relative to the secondary contact surface 27'.

In the embodiment with a centrifugally secured cutting insert according to FIG. 7 to 9, the cutting insert must be distanced by a considerable distance from the bottom surface of the seat in order to be removed. This means that also the clamping wedge 7 has to be removed from the proximity of the cutting insert. To do so, the wedge 7 must also become disengaged from the cartridge 6. For this reason, in order to keep the cartridge from falling out, a second clamping wedge 38 is provided, which is arranged as an extension of the first-mentioned clamping wedge 7 and which has the sole purpose of fixing the cartridge. This second clamping wedge 38 is tightenable by means of a second double-threaded screw 39. In their active, finally tightened states, the two clamping wedges 7, 38 cooperate to jointly clamp the cartridge, whereas, however, only the clamping wedge 7 simultaneously also clamps the cutting insert into the seat of the cartridge.

When the cutting insert is to be removed from the cartridge, the first clamping wedge 7 may be removed or unscrewed to such an extent that the cutting insert may be removed from the seat, without the cartridge being displaced from its given adjusted position, because the second clamping wedge 38 then still keeps the serrations 14, 15 in unaltered engagement with each other.

According to a preferred embodiment of the invention, the bottom wall 10 of the individual recess 5 is divided into at least two wall parts 10', 10", which are located at different respective radial distances from the rotation axis of the tool body, and which are separated by a first axially facing abutment surface 40 facing the cutting insert. This abutment surface 40 extends at an angle, suitably perpendicularly, to the serrations 14 formed in the trailing wall of the recess, and has the purpose of cooperating with an analogous second axially facing abutment wall 41 formed on the cartridge 6a which wall 41 also extends perpendicularly to the part wall 10'. This second abutment surface 41 extends correspondingly, suitably perpendicularly to the serrations 15 of the cartridge (in fact, perpendicularly to the axial extension of the ridges and grooves).

When the cartridge is mounted into the recess, its location can be determined, in a simple manner, in a predetermined basic position merely by the simple measure of bringing the serrations 14, 15 to slide along each other till the abutment surface 41 abuts the abutment surface 40.

Since both the abutment surface 40 on the tool body (also in this case the latter is made of aluminum) and the abutment surface 41 on the cartridge (usually of steel), may be made with high accuracy, the cartridge may in a simple manner be initially mounted in an exactly defined basic adjustment position, that is easily repeatable and uniform for all cartridges and recesses on the tool.

The tool may be provided with means for enabling a fine adjustment of the cartridge relative to the body. In FIG. 1 such a means is exemplified in the form of a separate key 42 that is insertable into a through, cylindrical bore 43 in the cartridge. The key 42 comprises a cylindrically shaped shaft 44 which at a free end carries an eccentric body 45 that shall be brought into engagement with an elongated depression 46 in the bottom part wall 10". Therefore, by turning the key, fine axial movements relative to the tool body may be applied to the cartridge, while the two clamping wedges are only moderately tightened. The ability to make fine-adjustments to the position of the cartridge, e.g., to thousandths or hundredths of a millimeter, is important on one hand in such cases when tolerance deviations occur in connection with manufacture, and on the other hand in such cases when the cartridge unexpectedly would have been dislocated from its basic adjustment position, e.g., due to shock impacts.

For the sake of completeness, it should be mentioned that the wall part 10" radially protruding relative to the bottom wall part 10', in its turn transposes into an angularly broken wall part 10' in which a threaded hole 47 for the clamping screw 39 ends. This wall part 10'" extends perpendicularly to the leading wall 8 of the recess, at the same time as the part wall 10" also extends perpendicularly to the trailing wall 9 provided with the serrations 14, which wall extends at an acute angle (e.g., within the range 25 to 35°) to the leading wall 8.

In FIG. 10 it is indicated schematically how the invention may advantageously also be applied on slitting cutters of the type that comprises an extremely thin, plate-shaped tool body 1. In this case, one single clamping wedge 7 may simultaneously hold a cartridge 6 as well as a cutting insert 17, it being possible in the previously described manner to clamp and maintain the cartridge in its, adjusted position also when the cutting insert is to be replaced or indexed.

FEASIBLE MODIFICATIONS OF THE INVENTION

The invention is not limited solely to the embodiments as described and shown in the drawings. Thus, the cutting inserts and the appurtenant seats in the cartridge may have other arbitrary basic shapes than just square or generally quadrilateral. The cutting inserts may, for instance, have a round or arbitrarily polygonal basic shape. Although the invention has been exemplified specifically in connection with a milling tool, it may also be applied to other types of rotating tools for chip-breaking machining of the kind that makes use of cartridges with detachable cutting inserts.

What is claimed is:

1. A metal chip-breaking machining tool comprising:
   a body having an outer envelope surface and defining a longitudinal axis of rotation, the body including:
      a plurality of radially outwardly opening recesses formed in the envelope surface, each recess defined by a generally radially extending leading wall, a generally radially extending trailing wall, and a bottom wall interconnecting radially inner ends of the leading and trailing walls,
      the trailing wall of each recess including first serrations extending substantially parallel to the axis;
   a plurality of cartridges mounted in respective ones of the recesses, each cartridge including:
      a leading side having an insert seat, and a contact surface situated radially inwardly of the seat, the contact surface of the cartridge lying substantially parallel to the leading wall of the respective recess,
      an insert removably disposed in the seat and including
         a top face facing in a direction of rotation of the body, and
      a trailing side disposed opposite the leading side and having second serrations meshed with the first serrations;
   a plurality of clamping wedges arranged in respective ones of said recesses for retaining respective cartridges and inserts, each clamping wedge including:
      a leading side forming a leading contact surface engaging the leading wall of the respective recess, and
      a trailing side forming:
         a trailing contact surface engaging the leading contact surface of the cartridge to press the second serrations against the first serrations, the trailing contact surface lying parallel to the leading contact surface of the wedge, and
         a secondary contact surface situated radially outwardly of the trailing contact surface and circumferentially trailing an imaginary plane containing the trailing contact surface, the secondary contact surface engaging the top face of the respective insert, to press the respective insert into the seat; and
   clamping screws securing respective clamping wedges in the recesses.

2. The tool according to claim 1, wherein the secondary contact surface and the trailing contact surface together form an angle in the range of 8° to 25°.

3. The tool according to claim 2 wherein the angle is in the range of 10° to 20°.

4. The tool according to claim 2 where in the angle is in the range of 11° to 15°.

5. The tool according to claim 1 wherein the top face of each insert includes a V-shaped groove, the trailing contact surface contacting the top face within the groove.

6. The tool according to claim 1 wherein each of the first and second serrations comprise ridges and grooves, the ridges of the first and second serrations disposed in the grooves of the second and first serrations, respectively, each of the cooperating ridges and grooves being of V-shaped cross-section, the ridges configured whereby peaks thereof are spaced from bottoms of the respective cooperating grooves.

7. The tool according to claim 1 wherein the top side of each insert includes a groove in which the trailing contact surface is engaged; each insert including a bottom side engaging a floor of the respective insert seat; one of the bottom side and floor including a recess, and the other of the bottom side and floor including a projection received in such recess.

8. The tool according to claim 1 wherein each clamping screw includes a right-hand thread and a left-hand thread, one of the threads being threadedly connected in a hole formed in the tool body, the other thread being threadedly connected in a hole extending through the respective clamping wedge, each of the right-hand and left-hand threads having limited play with respect to the threads to which they are connected.

9. A method of assembling a metal chip-breaking machining tool, the tool comprising:
   a body having an outer envelope surface and defining a longitudinal axis of rotation, the body including:
      a plurality of radially outwardly opening recesses formed in the envelope surface, each recess defined by a generally radially extending leading wall, a generally radially extending trailing wall, and a bottom wall interconnecting radially inner ends of the leading and trailing walls,
      the trailing wall of each recess including first serrations extending substantially parallel to the axis;
   a plurality of cartridges mounted in respective ones of the recesses, each cartridge including:
      a leading side having an insert seat, and a contact surface situated radially inwardly of the seat, the contact surface of the cartridge lying substantially parallel to the leading wall of the respective recess,
      an insert disposed in the seat and including a top face facing in a direction of rotation of the body, and
      a trailing side disposed opposite the leading side and having second serrations meshed with the first serrations;
   a plurality of clamping wedges arranged in respective ones of said recesses for retaining respective cartridges and inserts, each clamping wedge including:
      a leading side forming a leading contact surface engaging the leading wall of the respective recess, and
      a trailing side forming:
         a trailing contact surface engaging the leading contact surface of the cartridge to press the second serrations against the first serrations, the trailing contact surface lying parallel to the leading contact surface of the wedge, and
         a secondary contact surface situated radially outwardly of the trailing contact surface and circumferentially trailing an imaginary plane containing the trailing contact surface, the secondary contact surface engaging the top face of the respective insert, to press the insert into the seat; and clamping screws securing respective clamping wedges in the recesses;

the method comprising the steps of:
- A. inserting a cartridge into a respective recess by meshing the second serrations with the first serrations;
- B. inserting a clamping wedge into a space formed between the contact surface of the inserted cartridge and the leading wall of the respective recess, and partially tightening a respective clamping screw, whereby the trailing contact surface of the clamping wedge presses against the contact surface of the cartridge to secure the first and second serrations together;
- C. inserting an insert into the insert seat, with the top surface of the insert being spaced from the secondary contact surface of the clamping wedge;
- D. further tightening the clamping screw to cause the secondary contact surface to press against the top surface of the insert to secure the insert in the seat; and
- E. repeating steps A–D for the remaining cartridges.

10. The method according to claim 9 wherein step B further includes bringing the leading side of the clamping wedge into contact with a radially outer edge of the leading wall of the recess, whereby an acute angle is formed between the leading contact surface of the clamping wedge and the leading wall of the recess; step D further comprising causing the clamping wedge to turn about a fulcrum defined by the radially outer edge of the leading wall as the trailing contact surface of the clamping screw slides along the contact surface of the cartridge, to bring the secondary contact surface of the clamping wedge into pressing engagement with the top surface of the insert.

11. The method according to claim 10 wherein the clamping screw is mounted with play which accommodates the turning of the clamping wedge.

12. The method according to claim 9 wherein at least one of the trailing side of the clamping wedge and the leading side of the cartridge includes a chamfered surface which guides the clamping wedge into the space during step B.

13. The method according to claim 9 wherein the trailing side of the clamping wedge includes a first chamfered surface situated radially inwardly of the trailing contact surface, and the leading side of the cartridge includes a second chamfered surface situated radially outwardly of the contact surface of the cartridge, step B including causing the first chamfered surface to slide against the second chamfered surface to guide the clamping wedge into the space.

* * * * *